UNITED STATES PATENT OFFICE.

ASAHEL K. EATON, OF BROOKLYN, NEW YORK.

PREPARING PEROXIDE OF LEAD.

SPECIFICATION forming part of Letters Patent No. 266,115, dated October 17, 1882.

Application filed August 14, 1882. (No specimens.)

*To all whom it may concern:*

Be it known that I, ASAHEL K. EATON, of Brooklyn, in the county of Kings and State of New York, have invented a certain new and useful method of producing the peroxide of lead and simultaneously producing the acetate of lead, useful in the construction of storage-batteries, or for other purposes, of which the following is a specification in such full, clear, concise, and exact terms as to enable any one skilled in the art to which my invention belongs or with which it is most nearly connected to make and use the same.

In my various devices for the construction of storage-batteries, which are the subjects of applications for Letters Patent, I have made use of peroxide of lead and sponge lead in the construction of the two electrodes. The peroxide of lead not being a commercial article, I have been compelled to manufacture it myself as needed by the action of nitric acid upon minium, (red oxide of lead.) This method, which is the best given by chemical authorities, proves unsatisfactory on account of the expense and trouble attending it. I have therefore devised a simple and cheap method of producing the peroxide and of simultaneously producing acetate of lead, from which I prepare the lead sponge used in my storage-batteries.

The following is a full description of the process for producing these results and the chemical reactions and transformation.

Ordinary red lead (minium) is acted upon by the common acetic acid of commerce in the proportion of about two pounds of acetic acid to one pound of minium. This mixture is agitated for a short time, when the red lead will be found to have lost its bright color and to have become changed to a dark brown—*i. e.*, a portion of the oxide has been dissolved in the acetic acid, forming acetate of lead, and the balance remains as peroxide of lead. The chemical reactions are as follows: one equivalent minium $=2\ PbO,PbO_2$; two equivalents acetic acid $=C_4H_4O_4$. The combination of the acetic with the protoxide component of the minium gives the following result: one equivalent of peroxide $=PbO_2$; two equivalents of acetate of lead $=2\ (PbO,C_4H_3O_3,HO.)$ The acetate of lead thus formed, separated from the peroxide, is used as described in my former applications for the production of lead sponge.

Having described my invention, I claim and desire to secure by Letters Patent—

The chemical process, substantially herein described, of simultaneously producing peroxide and acetate of lead, which process consists of the treatment of red lead with acetic acid, by which the protoxide component of the red lead is removed, producing acetate of lead and leaving the peroxide of lead as a residuum, substantially as described.

A. K. EATON.

Witnesses:
AMOS BROADNAX,
WM. H. BROADNAX.